United States Patent
Dede

(10) Patent No.: US 10,903,537 B2
(45) Date of Patent: Jan. 26, 2021

(54) OPTIMIZED HEAT CONDUCTING MEMBER FOR BATTERY CELL THERMAL MANAGEMENT

(71) Applicant: Toyota Motor Engineering & Manufacturing North America, Inc., Plano, TX (US)

(72) Inventor: Ercan M. Dede, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 59 days.

(21) Appl. No.: 16/263,806

(22) Filed: Jan. 31, 2019

(65) Prior Publication Data
US 2020/0251793 A1    Aug. 6, 2020

(51) Int. Cl.
| H01M 10/052 | (2010.01) |
| H01M 10/658 | (2014.01) |
| B60L 58/26 | (2019.01) |
| H01M 10/48 | (2006.01) |
| H01M 10/6555 | (2014.01) |
| H01M 10/617 | (2014.01) |
| H01M 10/625 | (2014.01) |
| H01M 10/653 | (2014.01) |
| H01M 10/654 | (2014.01) |
| H01M 10/643 | (2014.01) |

(52) U.S. Cl.
CPC ........ *H01M 10/658* (2015.04); *B60L 58/26* (2019.02); *H01M 10/482* (2013.01); *H01M 10/486* (2013.01); *H01M 10/617* (2015.04); *H01M 10/625* (2015.04); *H01M 10/643* (2015.04); *H01M 10/653* (2015.04); *H01M 10/654* (2015.04); *H01M 10/6555* (2015.04)

(58) Field of Classification Search
CPC .................. H01M 10/052; H01M 10/4235
See application file for complete search history.

(56) References Cited

U.S. PATENT DOCUMENTS

| 3,731,737 A | 5/1973 | Jenssen |
| 4,605,060 A | 8/1986 | Andersson et al. |
| 5,242,016 A | 9/1993 | Voss et al. |
| 9,534,854 B2 | 1/2017 | Romlund |
| 9,865,904 B2 | 1/2018 | Lee et al. |
| 2001/0023761 A1 | 9/2001 | Motzet et al. |
| 2007/0261833 A1 | 11/2007 | Yang et al. |
| 2016/0240831 A1* | 8/2016 | Zeng ................ H01M 2/1686 |

FOREIGN PATENT DOCUMENTS

| CA | 2367990 | * | 9/2000 |
| EP | 2267391 B1 | | 4/2018 |
| WO | 199967591 A1 | | 12/1999 |

* cited by examiner

*Primary Examiner* — Olatunji A Godo
(74) *Attorney, Agent, or Firm* — Dinsmore & Shohl LLP

(57) ABSTRACT

A battery cell includes a first electrode, a second electrode, and a heat conducting member that is in thermal communication with the first electrode and the second electrode. The heat conducting member includes a thermally insulating portion and a thermally conducting portion that includes an individual thermal conductivity morphology.

20 Claims, 7 Drawing Sheets

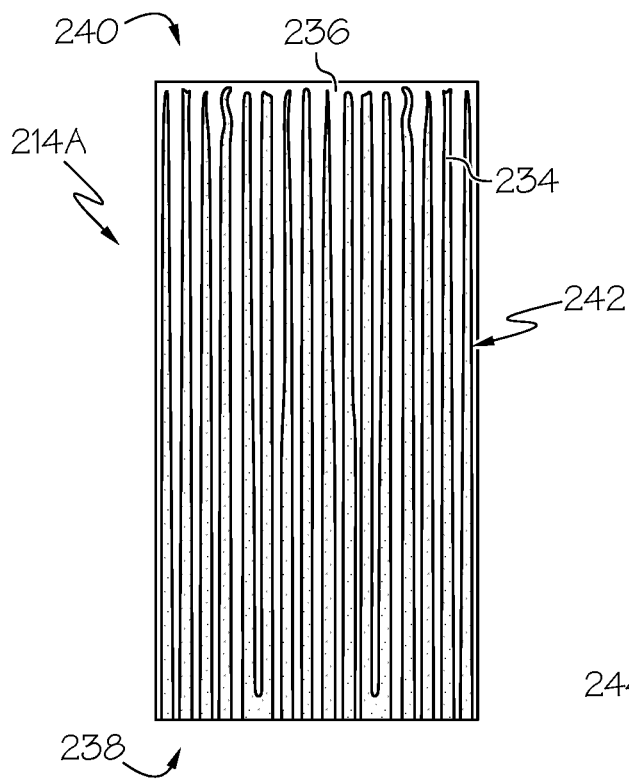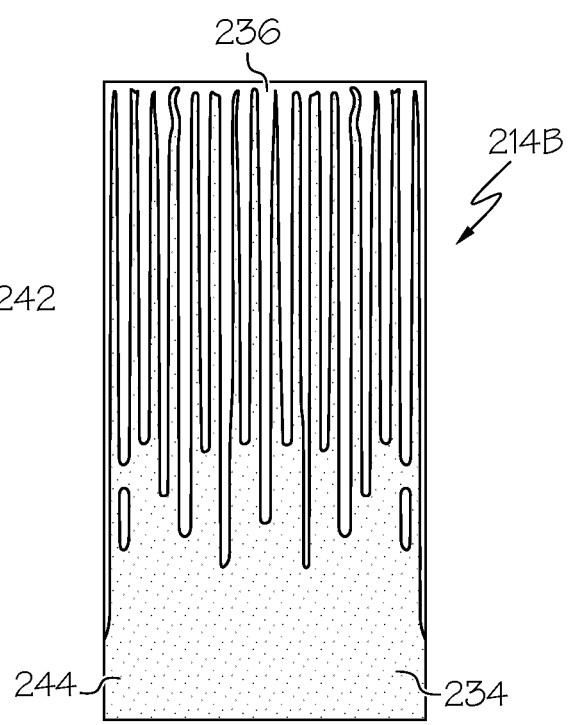
FIG. 5A  FIG. 5B
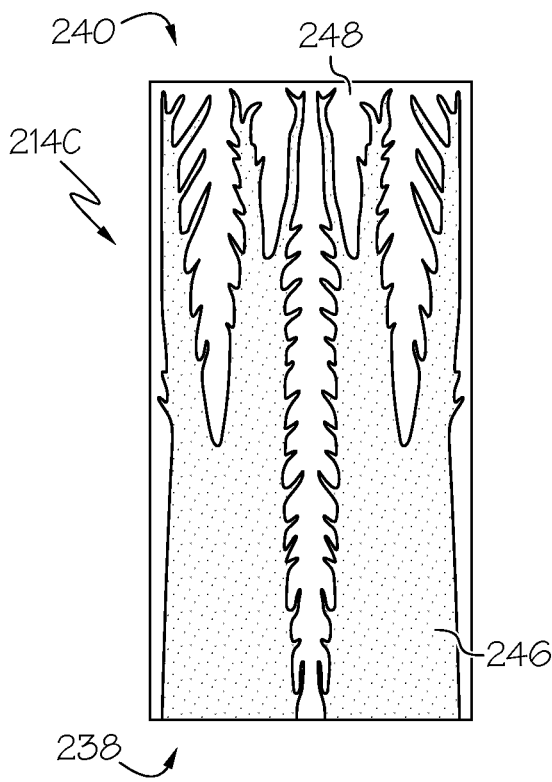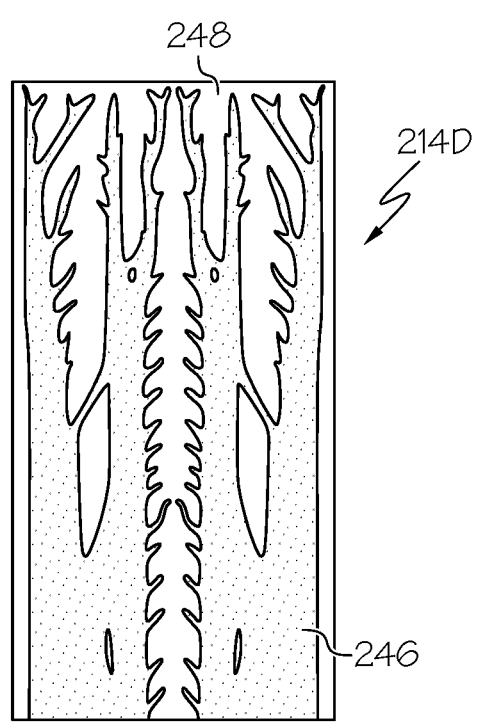
FIG. 5C  FIG. 5D

OPTIMIZED HEAT CONDUCTING MEMBER FOR BATTERY CELL THERMAL MANAGEMENT

TECHNICAL FIELD

The present specification generally relates to systems and methods for managing the temperature of battery cells and, more specifically, to optimized heat conducting members for battery cell thermal management.

BACKGROUND

Battery cells may generate waste heat during charge and discharge. Removal of waste heat from the battery cell can increase battery cell performance and prolong the useable life of the battery cell. Each battery cell may have an individual heat generation profile based on the thermal characteristics of the battery cell. Additionally, battery cells may be arranged into a bank and the heat generation profile of the bank may depend on the individual profiles of the cells.

Accordingly, a need exists for systems and methods that utilize optimized heat conducting members for battery cell thermal management.

SUMMARY

In one embodiment, a battery cell includes a first electrode, a second electrode, and a heat conducting member that is in thermal communication with the first electrode and the second electrode. The heat conducting member includes a thermally insulating portion and a thermally conducting portion that includes an individual thermal conductivity morphology.

In another embodiment, a battery assembly includes a battery assembly housing, a fluid channel, and an array of battery cells in electrical communication with one another inside the battery assembly housing. Each of the battery cells includes a first electrode, a second electrode, and a heat conducting member in thermal communication with the first electrode and the second electrode, the heat conducting member including a thermally insulating portion and a thermally conducting portion that together include an individual thermal conductivity morphology. Waste heat generated by the battery cells is transferred to the fluid channel through the thermally conducting portion.

In yet another embodiment, a method of removing heat from a battery cell includes determining a heat generation profile of one or more electrodes of a battery cell, generating a heat conducting member that includes an individual thermal conductivity morphology based on the heat generation profile of the one or more electrodes, and positioning the heat conducting member such that the heat conducting member is in thermal communication with one or more of the one or more electrodes.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A schematically depicts an embodiment of a cylindrical heat conducting member, according to one or more embodiments shown and described herein;

FIG. 5B schematically depicts another embodiment of a cylindrical heat conducting member, according to one or more embodiments shown and described herein;

FIG. 5C schematically depicts another embodiment of a cylindrical heat conducting member, according to one or more embodiments shown and described herein;

FIG. 5D schematically depicts another embodiment of a cylindrical heat conducting member, according to one or more embodiments shown and described herein.

DETAILED DESCRIPTION

Figure 1:
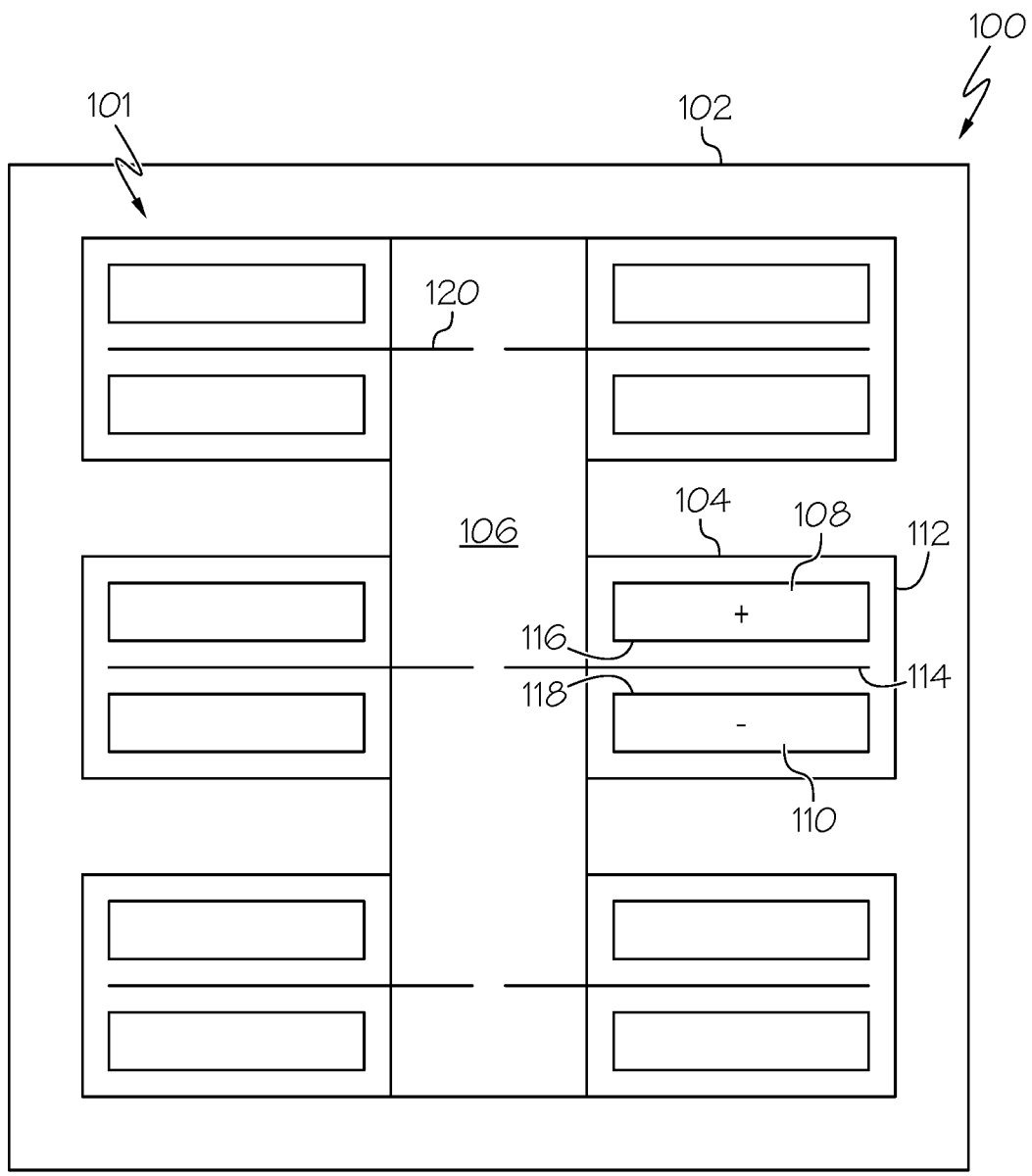
FIG. 1 schematically depicts a battery assembly, according to one or more embodiments shown and described herein.

Battery cells in a rechargeable (or "secondary") array may be discharged and recharged multiple times. Accordingly, components of the battery cell and associated systems must be configured to support repeated charge and discharge cycling. For example, electric vehicle batteries must be configured for repeated charge and discharge over the course of the life of the battery. Such cycling may be difficult on the battery. At the end of a battery's lifespan, it may require replacement or significant refurbishment. One reason for degradation of a battery over time is the generation of waste heat within the individual cells of the battery. The generation of heat is inevitable, and waste heat should be optimally removed. Suboptimal temperature control may affect the power and performance of a battery as well as reduce the overall lifespan, thereby increasing ownership cost of an electric vehicle or other battery powered devices and systems. Differences in the heat generation profile across cells in an array and across the array itself may complicate determination of optimal heat removal features.

Differences in heat generation profiles between cells in the same array can be due to various factors. For example, the location of a cell within an array, the age of a battery cell, the electrical loading on a cell, the existence of a heat removal system in thermal communication with the array and the relative location of a particular cell with respect to other cells in thermal communication with that heat removal system, etc. can contribute to heat generation variability Over the life of the battery, these differences can magnify, exacerbating differences across cells in the array as the battery repeatedly cycles through the charged and discharged states. Thermal profile differences, both across cells and an array as a whole, are not be accounted for by current battery cooling systems.

It may be possible to increase the lifespan, thermal efficiency, and electrical productivity of an array of battery cells using one or more cell components that are specifically tailored to the cell based on a heat generation profile of the cell. For example, it may be possible to prolong the life of one or more cells in an array by conducting heat from one or more of the electrodes of the cell using a heat conducting member that is specifically tailored to optimally remove heat from one or more of the electrodes in the cell. Because two electrodes may have distinct heat generation profiles, current battery systems that use a one-size-fits-all heat removal structure to remove heat from cells may remove heat suboptimally. Embodiments of the present disclosure may include heat conducting members with a heat conducting morphology that is complementary to one or more electrodes. The heat conducting morphology may be positioned in thermal communication with one or more of the electrodes to conduct heat away from the one or more electrodes and transport it to one or more support systems. Embodiments described herein include individually tailored heat removal systems that may extend the life of batteries, increasing usability and reducing costs.

Generally, the thermal conductance of a material may be determined based on an area, thickness, and thermal conductivity. The thermal conductance of a material is represented by $$\lambda = kA/L,$$

where $\lambda$ is the thermal conductance, k is the thermal conductivity, A is the cross-sectional area, and L is the thickness of the material. Individually tailored heat conducting members may generally have an individual thermal conductivity morphology that is defined by an interface between a portion with a relatively high thermal conductance and a portion with a relatively low thermal conductance. The shape of each portion may be controlled based on one or more design constraints. For example, the shape of each portion may be configured such that the relatively thermally conductive portion has a dendritic (i.e., with multiple branches) or a lamellar (i.e., with multiple chutes) morphology. Dendritic and lamellar morphologies may be the optimal heat conducting morphologies for removing heat based on the internal heat generation profiles of electrodes. Heat may preferentially flow through the relatively high thermal conductance portion such that heat flux is controlled within the heat conducting member.

Moreover, the thermal conductivity of materials (e.g., the thermally conducting member) may be affected by a number of factors, including temperature of the material itself and electrical conductivity and these properties may change over time. Accordingly, optimal conditions may change over time. Because it may be difficult or otherwise cost-prohibitive to change some or all of the structural components in a battery assembly, it may be desirable to aim for the optimal heat transfer characteristics based on some point in the life cycle of the battery. This point may be near the beginning of the life cycle of the battery, in the middle of the life cycle of the battery, or near the end of the life cycle of the battery. In some embodiments, the battery may be optimized based on one or more systems it supports or systems that it is supported by. For example, various thermal characteristics of the battery may be optimized based on a number of miles that an electric vehicle that uses the battery is expected to last. That is, if an electric vehicle is expected to last for 100,000 miles, the number of charge/discharge cycles required to drive the electric vehicle 100,000 miles may be calculated (on average, for example) and one or more optimal thermal characteristics may be based on that number. This is, of course, only one example of the many potential design considerations that a battery may be designed to optimize.

Now generally referring to FIG. 1, a non-limiting, example arrangement of battery cells in an array is depicted. Each of the battery cells in FIG. 1 includes a first electrode and a second electrode that are physically isolated from one another by a heat conducting member. In some embodiments, the heat conducting member may electrically isolate the two electrodes. The exemplary heat conducting member depicted in FIG. 1 absorbs waste heat generated by the first electrode and the second electrode and rejects the heat to a secondary medium. For example, the heat conducting member may reject the heat to a fluid (e.g., air, water, etc.) flowing through a fluid channel that surrounds one or more portions of the heat conducting member. As explained in greater detail herein, each of the heat conducting members depicted in FIG. 1 includes an individual dendritic or lamellar morphology that may be formed by the interface of a thermally insulating portion and a thermally conducting portion of the heat conducting member. The shape of the individual dendritic or lamellar morphology may be based on, among other things, the heat generation profile of one or more of the first electrode and the second electrode that are in thermal communication with the heat conducting member.

Still referring to FIG. 1, a battery assembly 100 is shown. The battery assembly 100 includes a battery assembly housing 102 that houses at least one battery cell 104 and a fluid channel 106. In embodiments including more than one battery cell 104, each battery cell 104 may include a separate battery cell housing and the battery cells 104 may be arranged in an array 101 of battery cells 104. Each of the battery cells 104 may include a first electrode 108 and a second electrode 110 which may be electrically coupled and may generate an electric current. As shown in FIG. 1, the first electrode 108 is a positive electrode and the second electrode 110 is a negative electrode, but embodiments are not limited to this arrangement. The battery cells 104 may also include a cell housing 112 that may isolate the components of the battery cell 104. Additionally the battery cell 104 may include a heat conducting member 114 that may be in thermal communication with one or more of the first electrode 108 and the second electrode 110. As will be described in greater detail herein, the heat conducting member 114 may include a thermally insulating portion and a thermally conducting portion that may optimize heat transfer of waste heat generated by the battery cell 104 from one or more of the first electrode 108 and the second electrode 110 to the fluid channel 106.

In some embodiments, the heat conducting member 114 may be a plate that spans between at least some portion of a first electrode heat flux surface 116 and a second electrode heat flux surface 118. The heat conducting member 114 may include a tab 120 that extends into the fluid channel 106. In some embodiments, the tab 120 spans an entire width of the battery cell 104. In other embodiments the tab 120 may span only a portion or multiple discrete portions of the width of the battery cell 104. The tab 120 may be in thermal communication with the fluid flowing in the fluid channel 106. More specifically, the fluid flowing through fluid channel 106 may contact the tab 120 and absorb heat from the tab 120, thereby removing heat generated within the battery cell 104. Non-limiting examples of the fluid that flows through the fluid channel 106 include air, water, refrigerant, and the like. In some embodiments, there is no fluid flow through the fluid channel 106.

In some embodiments, the heat conducting member 114 may be or may include a separator that consists of a polymeric membrane forming a microporous layer that is chemically and electrochemically stable with regard to an electrolyte that may flow between the first electrode 108 and the second electrode 110.

Figure 2:
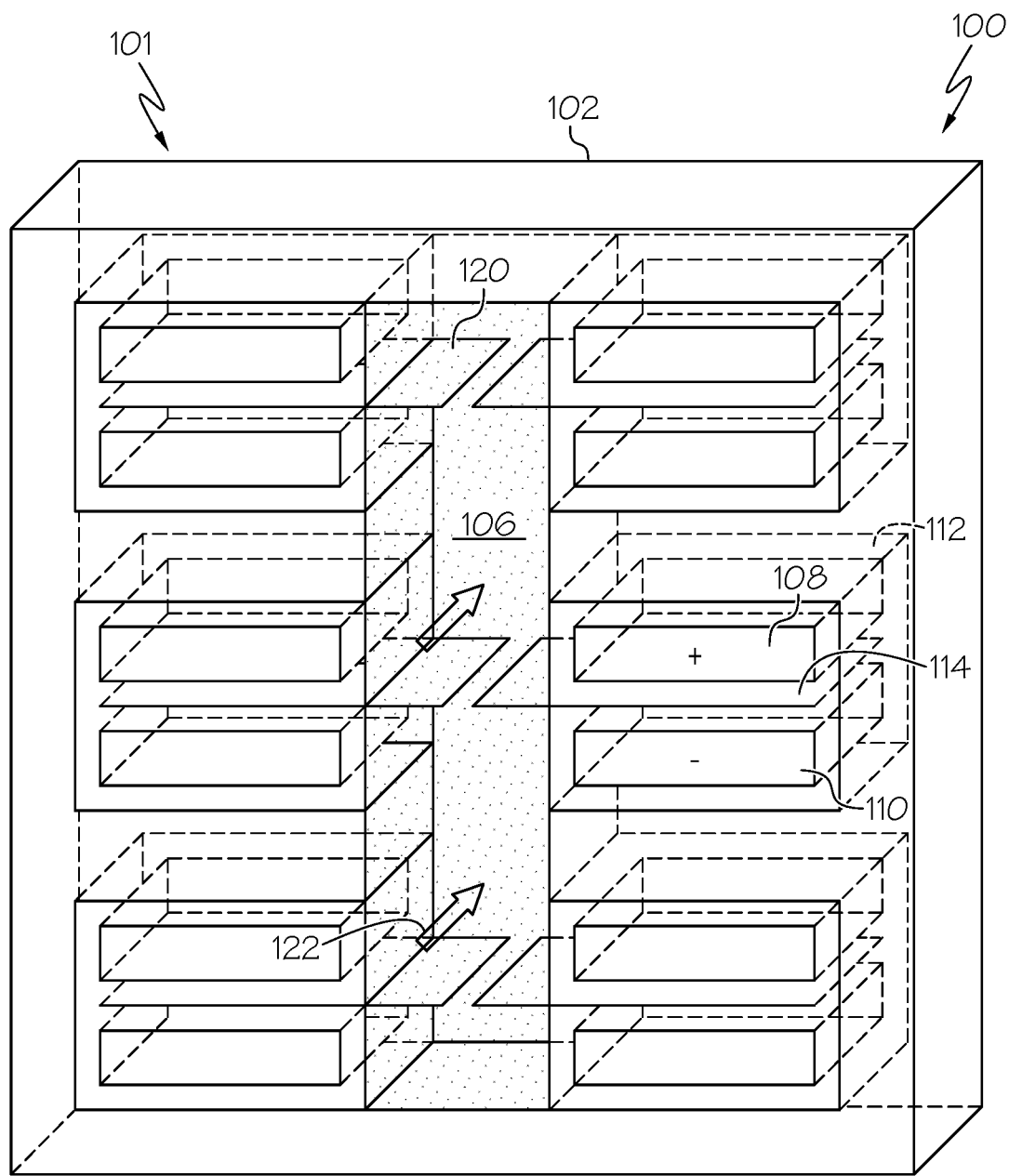
FIG. 2 schematically depicts a second view of the battery assembly of FIG. 1, according to one or more embodiments shown and described herein.

FIG. 2 shows a perspective view of the array 101 of FIG. 1. In some embodiments, multiple arrays 101 may be stacked back-to-back to form a rectangular battery assembly. It is contemplated that any number of arrays can be stacked together. Generally, as the number of arrays increases, the heat generation density of the battery assembly may increase and the heat generation profile of the individual cells 104 within the assembly may change. Accordingly, the specific morphologies of heat conducting portions of the cells 104 may be individually tailored based on the size of the assembly.

Referring both to FIGS. 1 and 2, a fluid, such as water, air, refrigerant, and the like, may flow through the fluid channel 106 in a flow direction as indicated by arrows 122. In some embodiments, an arrangement of the heat conducting members 114 is adaptable based on the flow direction. For example, the arrangement of the heat conducting members 114 may be based on maximizing the contact between the fluid flowing through the fluid channel 106 and the heat conducting members 114 and/or the tab 120. In some embodiments, the arrangement of the battery cells 104 may be arranged based on the flow direction. For example, the order of the battery cells 104 along the flow direction may be arranged such that battery cells 104 with the highest heat flux are nearest the fluid entrance to the fluid channel 106 such that these battery cells 104 are exposed to the coolest fluid flowing through the fluid channel. In some embodiments, a temperature of the fluid flowing through the fluid channel 106 may vary in one or more of a vertical direction and a horizontal direction. That is, there may be a gradient in the temperature of the fluid flowing through the fluid channel along its height and width. The battery cells 104 may be arranged along the fluid channel 106 based on this gradient, for example.

Figure 3:
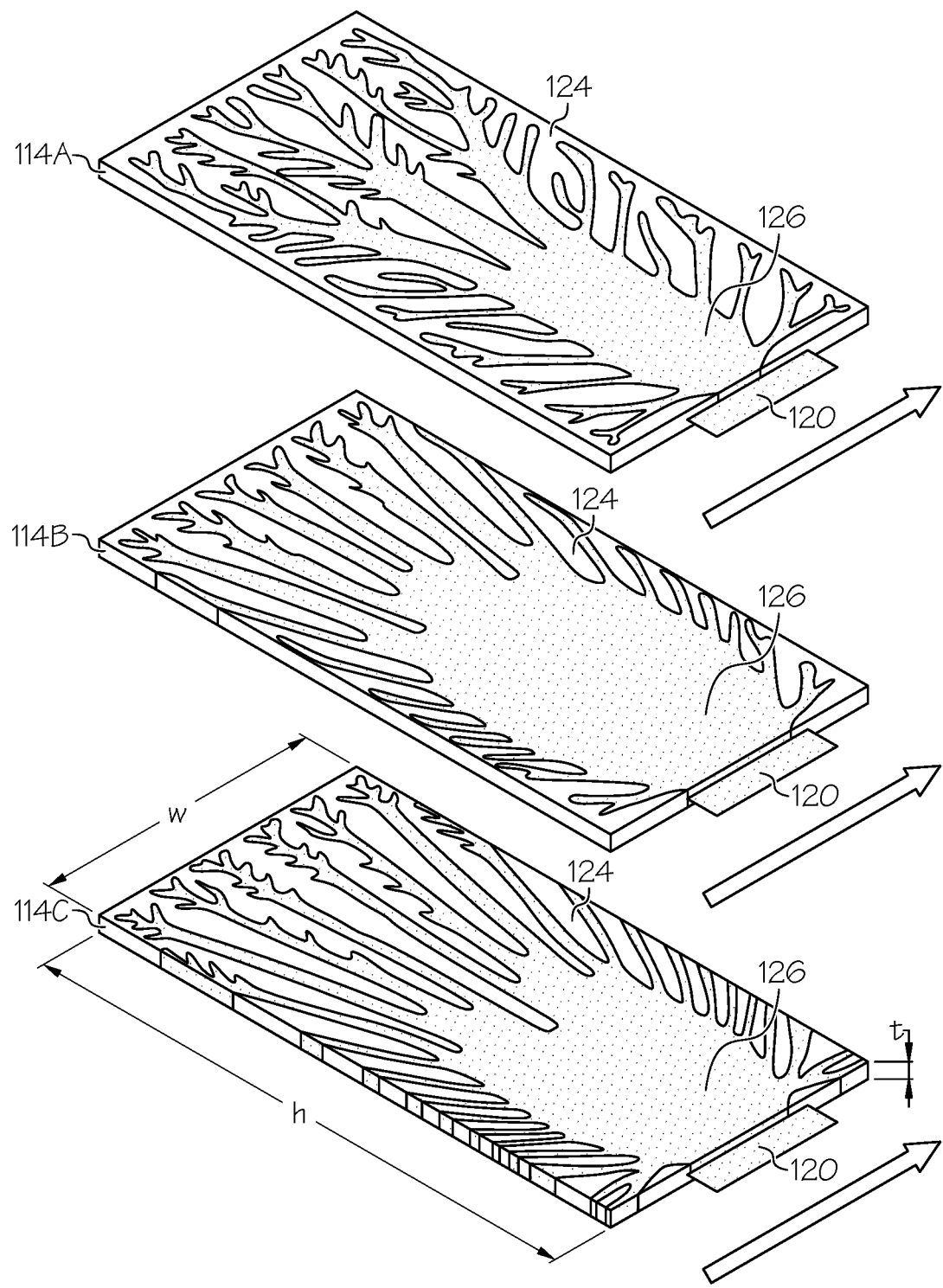
FIG. 3 schematically depicts multiple heat conducting members of the battery assembly of FIG. 1, according to one or more embodiments shown and described herein.

Referring now to FIG. 3, multiple example embodiments of heat conducting members 114A, 114B, 114C are schematically depicted in perspective views. Each heat conducting member 114A, 114B, 114C includes a thermally insulating portion 124 and a thermally conducting portion 126. The thermally insulating portion 124 and the thermally conducting portion 126 make up a thermal conductivity morphology that is specific to the particular heat conducting member 114A, 114B, 114C. The morphologies described herein include dendritic and lamellar morphologies but other morphologies are considered.

The thermally conducting portions 126 may be made from a thermally conductive material. As a non-limiting example, the thermally conducting portions 126 may be made from a thermally conductive metal such as copper, nickel, silver, gold, platinum, and the like. As another non-limiting example, the thermally conducting portions 126 may be made from a material with a carbon-based structure such as graphite, graphene, and the like. As another non-limiting example, the thermally conducting portions 126 may be made from a thermally conductive polymer, such as a thermally conductive graphene-polymer composite.

The thermally insulating portions 124 may be made from a thermally insulating material. For example, the thermally insulating portions 124 may be made from a polymer, such as for example, polypropylene, polyethylene, polystyrene and the like. In some embodiments, the thermally insulating portion 124 may be a coating applied at an external portion of the heat conducting member 114 that selectively inhibits heat flow from one or more of the first electrode 108 and the second electrode 110 from the electrode to the fluid channel 106 through the heat conducting member 114 to the fluid channel 106.

In some embodiments, the heat conducting member 114 may be a polymer matrix that includes two distinct portions, a first portion doped with, for example, a graphite and/or graphene matrix such that the first portion includes a graphite-polymer composite, and the second portion may be, for example, a polymer that does not include graphite and/or graphene such that the first portion is relatively thermally conductive as compared to the second portion. The first portion may be the conductive portion 126 and the second portion may be the insulating portion 124, for example. The two distinct portions may be formed simultaneously. For example, the two distinct portions may be injection molded simultaneously such that the heat conducting member 114 is one solid mass of injection molded polymer, the first portion being thermally conductive and the second portion not thermally conductive.

Referring to both FIGS. 1 and 3, embodiments of the present disclosure include individual cells that are separate from the cell housing 112. For example, embodiments may include a first electrode and a second electrode separated by a heat conducting member, like the heat conducting member 114, and the first electrode and the second electrode may not be surrounded or otherwise housed in a cell housing like the cell housing 112. Additionally, the present disclosure includes embodiments having multiple cells without a battery assembly housing 102.

The individual morphology of the heat conducting member 114 may be based on the heat generation profile of the electrode or electrodes in thermal communication with the heat conducting member 114. The heat generation profile of an electrode may be determined experimentally or theoretically. As non-limiting examples, the individual heat generation profiles of individual cells 104 may be determined using one or more of current step methods, alternating current methods, electrochemical impedance spectroscopy, and thermal loss methods. One or more implements may be used to determine the thermal profile of the individual cells 104, such as, for example, thermometers, thermocouples, resistors, thermocapacitors, infrared detectors (e.g., an infrared camera), temperature sensitive diodes, and the like. In some embodiments, one or more assumptions for battery thermal modeling may be applied when determining the optimized morphology of the heat conducting member 114. For example, one or more assumptions about the battery cell 104 or its components may be made. One or more of the battery cell 104 and the battery assembly 100 may be considered to be homogenous, for example, when determining the optimized morphology. In some embodiments, the battery cells may be considered to be isotropic when generating the optimized heat conducting member morphologies. In other embodiments, the thermal properties of the battery assembly 100 and the battery cells 104, for example, the thermal conductivity, the thermal expansion properties, etc., may be considered to be constant across the battery assembly 100 and/or the battery cells 104 individually.

The individual morphology of the heat conducting member 114 may have a dendritic structure. The dendritic structure may be generally characterized by multiple branches that converge to a main stem. The size of the branches may generally decrease with increasing distance away from the main stem. That is, a cross-sectional area of the branches, taken orthogonally from the direction of heat flux, generally decreases along the branch in a direction away from the main stem. Based on thermal conductance principles, heat may preferentially flow from areas of lower conductance to areas of higher conductance and thus a flux develops toward the main stem. The main stem is in thermal communication with the tab 120 and because the tab 120 is in thermal communication with the fluid in the fluid channel 106 (FIGS. 1 and 2), heat may transfer to the fluid. In embodiments, the shape of the branches and main stem is based on optimizing the performance of the battery as described herein.

The heat conducting member 114 may have a thermal conductivity morphology that is dynamic throughout a thickness of the heat conducting member 114. For example, in some embodiments, the individual branches may pass through an entire thickness t of the heat conducting member 114, although this is not required. In some embodiments, the thickness of the branches is not equivalent to the thickness of the heat conducting member 114 across the entire area of the thermally conducting portion 126. Additionally, in some embodiments, the size and shape of the dendritic structure may not be the same throughout the thickness of the heat conducting member 114, for example, the size and structure of the dendritic morphology may be smaller on one side of the heat conducting member 114 based on the electrode on that side having a different temperature generation profile than the electrode that is thermally coupled to the opposite side of the heat conducting member 114.

In some embodiments, the heat conducting member 114 may be electrically insulated from the first electrode 108 and the second electrode 110 by an electrically insulating material, for example, an electrically insulating polymer or ceramic. For example, in embodiments in which the thermally conducting portion 126 and/or the thermally insulating portion 124 of the heat conducting member 114 is electrically conductive, an electrically insulating material may be placed in between one or more of the first electrode 108 and the second electrode 110 to prevent electricity flowing through the heat conducting member 114.

In embodiments, the heat conducting member 114 may be optimized based on the specific heat generation profile of the particular battery cell 104 in which it is positioned. This may improve the thermal performance of the battery cell 104 and thus the electrical performance of the battery cell 104. The optimization of the heat conducting member 114 may be determined using one or more techniques. For example, the optimization may be determined using one or more computer simulations or theoretical calculations. In other embodiments, the optimization of the heat conducting member 114 may be based on one or more empirical observations or studies. In some embodiments, the optimization of the heat conducting member 114 is determined both theoretically and empirically.

Referring again to FIG. 2, various arrangements of the multiple battery cells 104 within the array 101 are contemplated. For example, in embodiments, the battery cells 104 may be arranged according to the relative conductivity of their individual heat conducting members 114. For example, the battery cells 104 may be arranged within the array 101 such that the battery cells 104 with a heat conducting member 114 that is relatively conductive as compared to other heat conducting members 114 within the array may be near a fluid entrance to the fluid channel 106. That is, the heat conducting members 114 with a relatively high thermal conductivity are positioned downstream of the heat conducting members with a relatively low thermal conductivity. In other embodiments, battery cells 104 with a heat conducting member 114 with a relatively low thermal conductivity as compared to other heat conducting members may be positioned near a fluid entrance to the fluid channel 106. That is, the heat conducting members 114 with a relatively low thermal conductivity are positioned downstream of the heat conducting members with a relatively high thermal conductivity.

In some embodiments, the thermal conductivity morphology of the heat conducting member 114 is determined based on a particular current density of the battery cell 104. For example, the morphology of the heat conducting member 114 may be based on a heat generation profile of the cell 104 at a maximum current density such that the heat conducting member 114 removes heat from cell electrodes most efficiently when the battery cell 104 is operating at maximum current density. In other embodiments, the thermal conductivity morphology of the heat conducting member 114 may be based on a most likely current density of the cell 104. That is, for example, in cells 104 that are used in an electric vehicle, the electric vehicle may be most likely to drive at a particular speed (e.g., 35 mph) which may result in a particular current density within the cells 104. In such embodiments, one or more of the thermal conductivity morphologies of the heat conducting members 114 may be configured such that they remove heat from the electrodes most efficiently when the current draw from the cell 104 is at the rate required to drive the vehicle at the most likely speed.

Figure 4A:
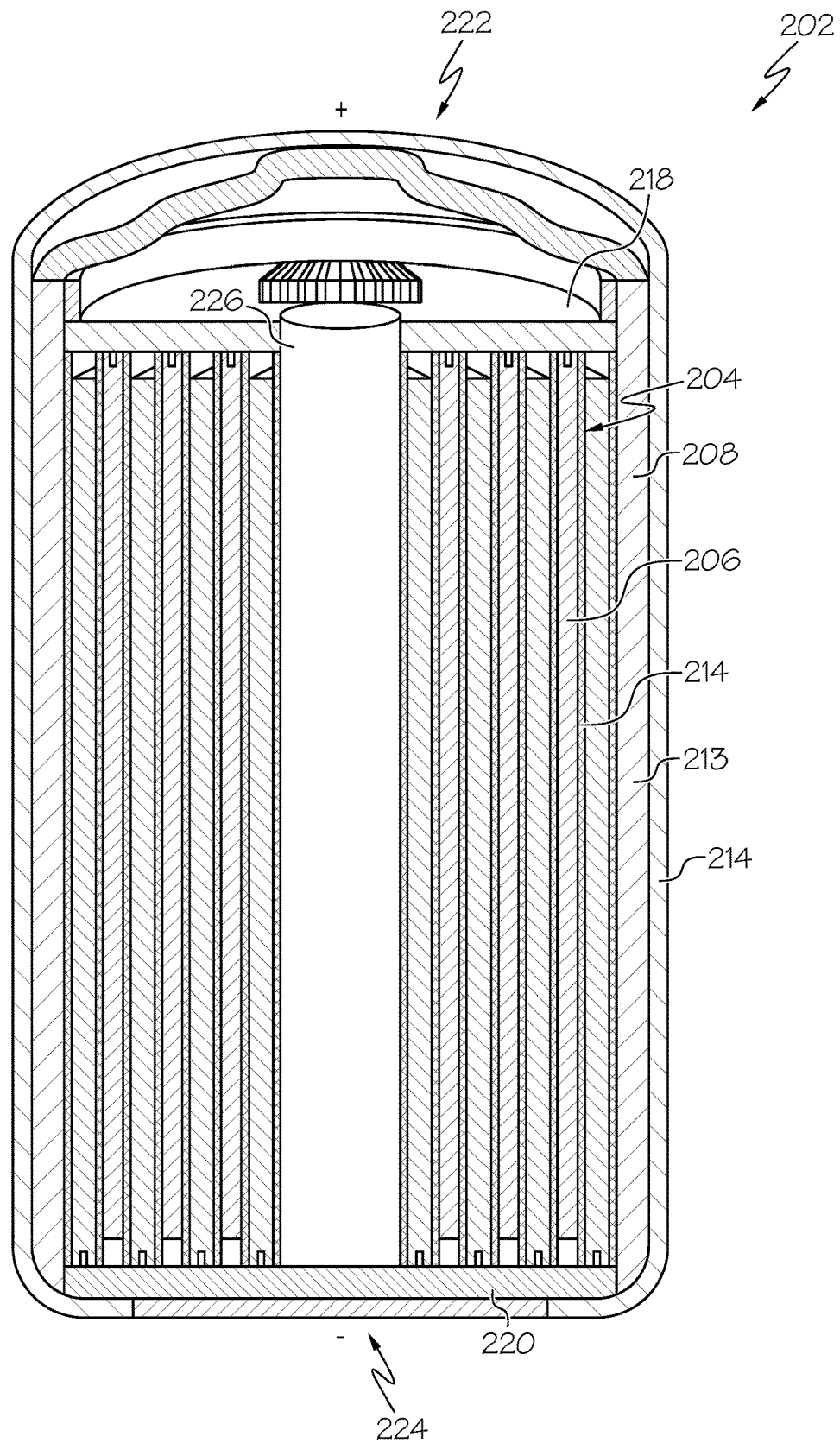
FIG. 4A schematically depicts a battery including one or more cylindrical electrodes separated by one or more cylindrical heat conducting members, according to one or more embodiments shown and described herein.
Figure 6:
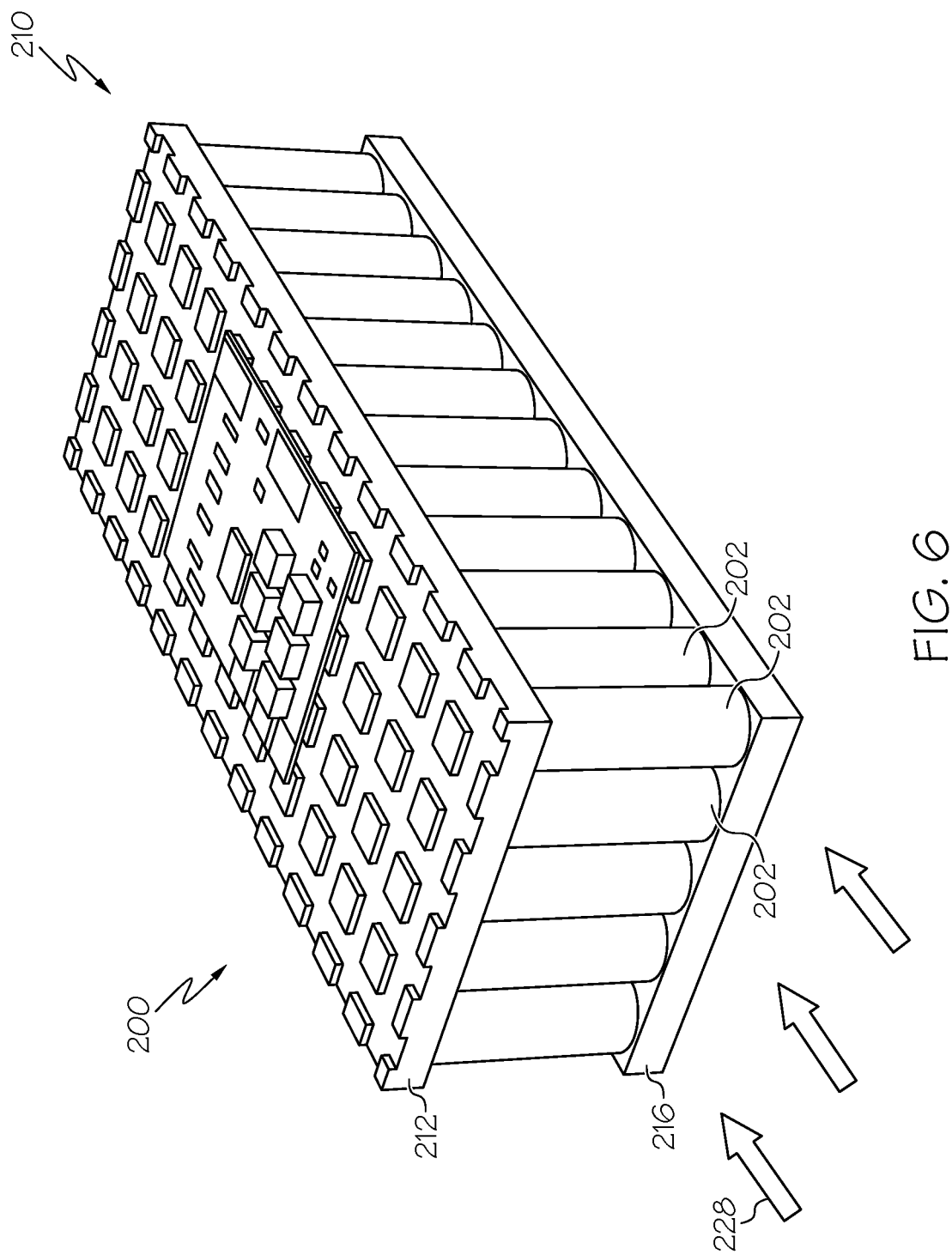
FIG. 6 schematically depicts a battery assembly including multiple cylindrical batteries, according to one or more embodiments shown and described herein.

Referring now to FIG. 6, another embodiment of a battery assembly 200 is shown. FIG. 6 shows an array of batteries 202 that are similar to the battery 202 shown in FIG. 4A. As shown in FIG. 4A, a battery 202 includes multiple cylindrical cells 204. Each cell 204 of the battery 202 includes a cylindrical first electrode 206 and a cylindrical second electrode 208. The first electrode 206 and the second electrode 208 may be separated by a cylindrical heat conducting member 214. Heat conducting members 214 may be positioned between an electrode and a sidewall 213 and/or between an electrode and a core 226. The cylindrical heat conducting member 214 morphology may be individually tailored based on the heat generation profile of one or more of the first electrode 206 and the second electrode 208 to conduct heat from the electrode to one or more of a top plate 218 and a bottom plate 220 as will be described in greater detail herein. The first electrode 206, the second electrode 208, and the heat conducting member 214 may be wrapped around the core 226.

Referring to FIG. 6, the multiple batteries 202 can be electrically coupled using one or more electrical connections in a battery housing 210 including a housing top structure 212 and a housing base structure 216. It is contemplated that embodiments may not include a battery housing 210 or may include only one battery 202. Referring to FIGS. 6 and 4A, in some embodiments, the housing top structure 212 and the housing base structure 216 may be configured to remove heat from one or more of the top plate 218 and the bottom plate 220. One or more of the top plate 218 and the bottom plate may have a relatively high heat capacity as compared with the first electrode 206 and the second electrode 208. Electrical current may be generated by one or more of the first electrode 206 and the second electrode 208 and may flow to one or more of a first terminal 222 and a second terminal 224. In some embodiments, a fluid as shown by arrows 228 (e.g., air, water, refrigerant, etc.) may flow in thermal communication with the one or more batteries 202 to remove heat from the batteries.

Figure 4B:
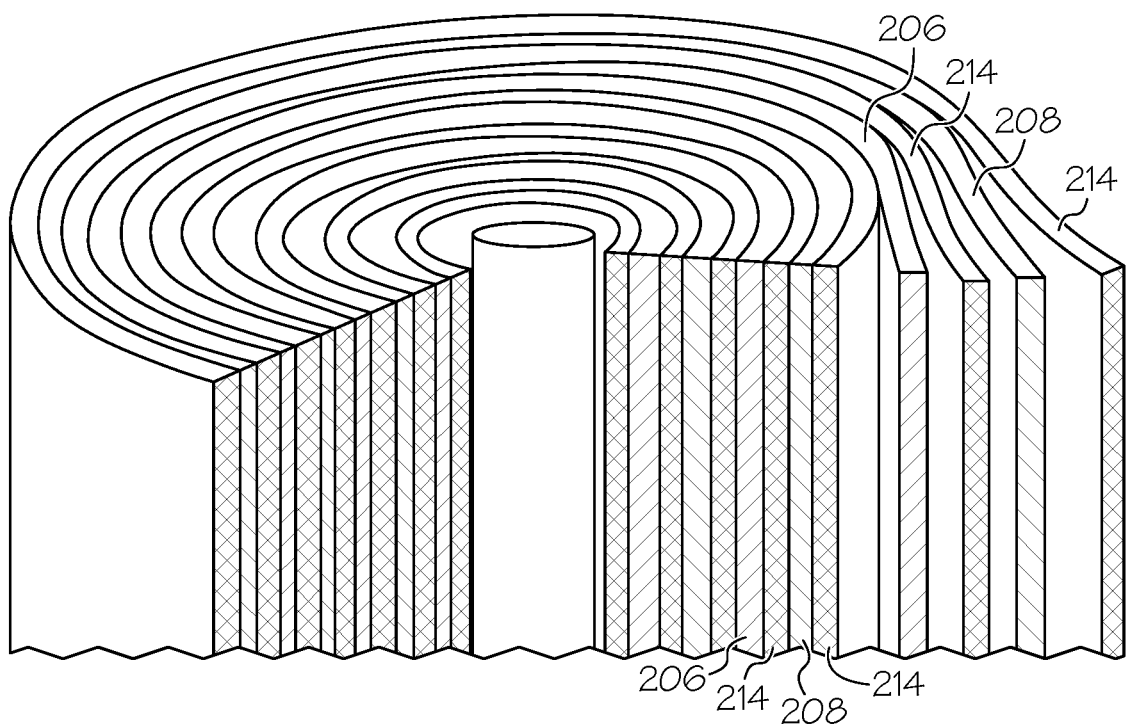
FIG. 4B schematically depicts a portion of the battery of FIG. 4A, according to one or more embodiments shown and described herein.

FIG. 4B shows a section of the battery 202 of FIG. 4A. Referring to FIGS. 4A and 4B, each of the first electrode 206, the second electrode 208, and the heat conducting member 214 may be a cylindrical sheet or layer that wraps around the outside of the coincident layers forming multiple concentric layers. Heat may be conducted from the first electrode 206 and the second electrode 208 to the heat conducting member 214. While the particular embodiment depicted includes one heat conducting member 214 between each first electrode 206 and second electrode 208, it is to be understood that other embodiments may include multiple heat conducting members 214 between electrodes. For example, embodiments are contemplated in which two heat conducting members 214 are positioned between the first electrode 206 and the second electrode 208. In such embodiments, one of the two heat conducting members 214 may be tailored to the first electrode 206 and one of the heat conducting members 214 may be tailored to the second electrode 208.

FIGS. 5A, 5B, 5C, and 5D show various embodiments of heat removal morphologies for various heat conducting members 214. The heat conducting members 214A, 214B, 214C, and 214D shown in FIGS. 5A, 5B, 5C, and 5D, respectively, are exemplary heat conducting members 214 that could be wrapped around the core 226 in between the first electrode 206 and the second electrode 208, for example. As shown, the heat conducting members 214 are flattened to illustrate their respective features. Referring to FIGS. 5A and 5B, each of the heat conducting members 214A, 214B has a thermally conducting portion 234 and a thermally insulating portion 236. The shape of the interface between the thermally conducting portion 234 and the thermally insulating portion 236 (i.e., the heat conducting member morphology) may be optimized to remove heat from one or more of the first electrode 206 and the second electrode 208 shown in FIGS. 4A and 4B. Referring to FIGS. 5C and 5D, each of the heat conducting members 214C, 214D has a thermally conducting portion 246 and a thermally insulating portion 248. The shape of the interface between the thermally conducting portion 246 and the thermally insulating portion 248 (i.e., the heat conducting member morphology) may be optimized to remove heat from one or more of the first electrode 206 and the second electrode 208 shown in FIGS. 4A and 4B.

Referring to FIGS. 5A and 5B, the interface between the thermally conducting portion 234 and the thermally insulating portion 236 may have a lamellar morphology that is tailored specifically for removing heat from the one or more electrodes in thermal communication with the heat conducting member 214. A lamellar morphology generally includes columns 242 of a conductive material (e.g., graphite, a metal, etc.) that may extend all or substantially all the way from a first end 238 of the heat conducting member to a second end 240 of the heat conducting member 214. The first end 238 and the second end 240 could be in any orientation with respect to the battery 202. That is, the first end 238 could be at a top of the battery 202 and the second end 240 could be at a bottom, and vice-a-versa. In some embodiments, as shown in FIG. 5B, the columns may extend from a base 244. The base 244 may be a portion of the heat conducting member 214 that includes a region of thermally conductive material that is denser than other areas of the thermally conductive material on the same heat conducting member 214. For example, the base 244 may not include columns 242 but be a continuous portion of thermally conducting portion across a width of the heat conducting member 214. The lamellar morphology may be composed of, for example, fine, alternating layers of a thermally conducting material and a thermally insulating material. The lamellar morphology may be formed, for example, by causing a phase transformation front to move rapidly across two solids (e.g., the thermally conducting portion 234 and the thermally insulating portion 236) such that the two solids rapidly cool. This may force phases of different composition to form but allow little time for diffusion to produce those phases' equilibrium compositions such that fine lamellae develop shortening the diffusion distance between phases. The lamellae may pass through an entire thickness of the heat conducting member 214. Heat generated by the electrodes may flow preferentially through the thermally conducting portion 234 and not flow through the thermally insulating portion 236. The ratio of thermally conducting portion 234 to thermally insulating portion. The base 244 of the heat conducting member 214 may have a relatively larger proportion of the thermally conducting portion 234 to thermally insulating portion 236. This may cause a heat gradient in the heat conducting member 214 from second end 240 to first end 238 through the columns 242. This may transport heat from the electrodes toward the fluid 228 (FIG. 6).

Referring to FIGS. 5C and 5D, in some embodiments, the interface between the thermally conducting portion 246 and the thermally insulating portion 248 may include a dendritic morphology that is tailored specifically for removing heat from the one or more electrodes in thermal communication with the heat conducting member 214. The dendritic structure may generally be characterized by multiple branches that converge to a main stem. Some embodiments may include multiple main stems. As discussed above with respect to the dendritic structures shown in FIG. 3, the dendritic structures shown in FIGS. 5C and 5D may cause heat to flow from the branches toward the stem and thus toward the first end 238 of the heat conducting member 214C, 214D. In some embodiments, the size of the individual branches may be constant through an entire thickness of the heat conducting member 214C, 214D, although this is not required. In some embodiments, the size of the thermally conducting portion 246 is not constant throughout the thickness of the heat conducting member 214C, 214D. For example, the size and structure of the dendritic morphology may be different on one side of the heat conducting member 214C, 214D based on the electrode on that side having a different temperature generation profile than the electrode that is thermally coupled to the opposite side of the heat conducting member 214C, 214D.

Referring to FIGS. 5A, 5B, 5C, and 5D, the thermally conducting portion 234, 246 may be made from a thermally conductive material. As a non-limiting example, the thermally conducting portions 234, 246 may be made from a thermally conductive metal such as copper, nickel, silver, gold, platinum, and the like. As another non-limiting example, the thermally conducting portions 234, 246 may be made from a carbon structure such as graphite, graphene, and the like. As another non-limiting example, the thermally conducting portion 234, 246 may be made from a thermally conductive polymer, such as a thermally conductive graphene-polymer composite.

The thermally insulating portions 236, 248 may be made from a thermally insulating material. For example, the thermally insulating portions 236, 248 may be made from a polymer, such as for example, polypropylene, polyethylene, polystyrene and the like. In some embodiments, the thermally insulating portion 236, 248 may be a coating applied at an external portion of the heat conducting member 214 that selectively inhibits heat flow from one or more of the first electrode 206 and the second electrode 208 from the electrode to the top plate 218 (FIG. 4A) and/or the bottom plate 220 (FIG. 4A) through the heat conducting member 214. In some embodiments, the heat conducting member 214 may be a polymer matrix that is generally characterized by two distinct portions, a first portion doped with a graphite and/or graphene matrix such that the first portion includes a graphite-polymer composite, and the second portion a simple polymer that does not include graphite and/or graphene such that the first portion is relatively thermally conductive as compared to the second portion. In embodiments, the first portion may be the heat conducting portion 234, 246 and the second portion may be the insulating portion 236, 248. The two distinct portions may be formed simultaneously, for example, the two distinct portions may be injection molded simultaneously such that the heat conducting member 214 is one solid mass of injection molded polymer, the first portion being thermally conductive and the second portion not thermally conductive.

The individual morphology of the heat conducting member 214 may be based on the heat generation profile of the electrode or electrodes in thermal communication with the heat conducting member 214. The heat generation profile of an electrode may be determined experimentally or theoretically as discussed herein. As non-limiting examples, the individual heat generation profiles of individual batteries 202 or layers thereof may be determined using one or more of current step methods, alternating current methods, electrochemical impedance spectroscopy, and thermal loss methods. One or more implements may be used to determine the thermal profile of the batteries 202, such as, for example, thermometers, thermocouples, resistors, thermocapacitors, infrared detectors (e.g., an infrared camera), temperature sensitive diodes, and the like.

In some embodiments, the morphology of the heat conducting member 214 is optimized based on a particular current density of one or more of the battery 202 or battery assembly 200. For example, the morphology of the heat conducting member 214 may be optimized based on a maximum current density such that the heat conducting member 214 removes heat from the one or more electrodes most efficiently when one or more of the battery 202 and the battery assembly 200 is operating at maximum current density. In other embodiments, the morphology of the heat conducting member 214 may be optimized based on a most likely current density of one or more of the battery 202 and the battery assembly 200. For example, in batteries 202 that are used in an electric vehicle, the electric vehicle may be most likely to drive at a particular speed (e.g., 35 mph) which may result in a particular current density within the battery 202 and/or the battery assembly 200. In such embodiments, one or more of the morphologies of the heat conducting members 214 of the battery 202 and the battery assembly 200 may be configured such that they remove heat from the electrodes most efficiently when the current draw is from the battery 202 and battery assembly 200 is at the 35 mph rate. Additionally, the different heat conducting members 214 in the same battery 202 may have different morphologies.

In some embodiments, the heat flux through the heat conducting member 214 is anisotropic. That is, heat may flow preferentially in one or more directions within the thermally conducting portion 234. For example, the heat conducting members 214 may be configured such that heat flows preferentially in a longitudinal dimension of the battery 202 as shown in FIG. 4A. This may result in heat flowing longitudinally toward the top plate 218 and the bottom plate 220 rather than radially, inhibiting heat from flowing from one electrode to another. For example, the graphene fibers in a graphene-polymer matrix heat conducting member 214 may be oriented such that heat preferentially flows longitudinally inside the heat conducting member 214. This arrangement may increase heat flux in the longitudinal direction while inhibiting heat flux in the transverse direction. For example, with respect to the dendritic heat conducting members 214C, 214D shown in FIGS. 5C and 5D, respectively, heat may flow preferentially through the stem rather than along the branches which are not oriented in parallel with a longitudinal axis of the heat conducting member 214C and 214D. In some embodiments, the thermally conducting portion 234 may be thermally anisotropic such heat flows preferentially from the exterior surface of the heat conducting member 214 to an interior portion of the heat conducting member 214. This may cause a gradient in the direction of the interior of the heat conducting member 214 such that heat is drawn away from the electrodes at the surface of the heat conducting member 214.

It should now be understood that a heat transfer profile of battery cell may be adapted based on the desired characteristics of an individual battery cell or a battery cell assembly. The heat transfer profile of the battery cell may be adapted based on a heat generation profile of one or more electrodes of the battery cell. The heat transfer profile of the battery cell may be adapted by designing the morphology of a thermally conducting portion of a heat conducting member of the battery cell. The thermally conducting portion may take a dendritic or a lamellar morphology that optimizes the heat transfer characteristics from one or more electrodes of the battery cell to an external medium, for example, a fluid flowing through a fluid channel that is in thermal communication with the battery cell. The heat transfer morphologies of various battery cells may be arranged so as to optimize the heat transfer characteristics of a battery assembly and thermal optimization may increase the electrical efficiency and lengthen the useable life of the battery assembly. Thus, the thermally-optimized heat transfer assembly may be used to power one or more electric components or assemblies more efficiently for a longer period of time.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery cell comprising:
   a first electrode;
   a second electrode; and
   a heat conducting member that is in thermal communication with the first electrode and the second electrode, the heat conducting member comprising a thermally insulating portion and a thermally conducting portion that comprises an individual thermal conductivity morphology.

2. The battery cell of claim 1, wherein the individual thermal conductivity morphology is a dendritic morphology.

3. The battery cell of claim 1, wherein the individual thermal conductivity morphology is a lamellar morphology.

4. The battery cell of claim 1, wherein the heat conducting member extends in a plane between at least some portion of a first electrode heat flux surface and a second electrode heat flux surface.

5. The battery cell of claim 4, wherein a tab extends from the heat conducting member and the tab is in thermal communication with a fluid flowing over the tab.

6. The battery cell of claim 1, wherein the individual thermal conductivity morphology is constant through a thickness of the heat conducting member.

7. The battery cell of claim 1, wherein the individual thermal conductivity morphology varies through a thickness of the heat conducting member.

8. A battery assembly comprising:
   a battery assembly housing;
   a fluid channel; and
   an array of battery cells in electrical communication with one another inside the battery assembly housing, each of the battery cells comprising:
     a first electrode;
     a second electrode; and
     a heat conducting member in thermal communication with the first electrode and the second electrode, the heat conducting member comprising a thermally insulating portion and a thermally conducting portion that together comprise an individual thermal conductivity morphology, wherein waste heat generated by the battery cells is transferred to the fluid channel through the thermally conducting portion.

9. The battery assembly of claim 8, wherein the thermal conductivity morphology is configured based on a heat generation profile of the battery cell.

10. The battery assembly of claim 8, wherein the heat conducting member is positioned between at least a portion of a first electrode heat flux surface and at least a portion of a second electrode heat flux surface.

11. The battery assembly of claim 10, wherein a tab extends from the heat conducting member into the fluid channel.

12. The battery assembly of claim 8, wherein the individual thermal conductivity morphology is constant through a thickness of the heat conducting member.

13. The battery assembly of claim 8, wherein the individual thermal conductivity morphology varies through a thickness of the heat conducting member.

14. The battery assembly of claim 8, wherein an arrangement of the heat conducting members within the array is configured based on a heat generation profile of the battery assembly.

15. The battery assembly of claim 8, wherein:
   a fluid flows in thermal communication with one or more of the heat conducting members in a flow direction; and
   an arrangement of the heat conducting members within the array is configured based on one or more of the flow direction and one or more fluid flow characteristics.

16. The battery assembly of claim 15, wherein the battery cells are arranged within the array such that heat conducting members with a high thermal conductivity are positioned downstream of the heat conducting members with a low thermal conductivity in the flow direction.

17. The battery assembly of claim 15, wherein the heat conducting members are arranged within the array such that heat conducting members with a low thermal conductivity are positioned downstream of the heat conducting members with a high thermal conductivity in the flow direction.

18. A method of removing heat from a battery cell comprising:
   determining a heat generation profile of one or more electrodes of a battery cell;
   generating a heat conducting member comprising an individual thermal conductivity morphology based on the heat generation profile of the one or more electrodes, wherein the individual thermal conductivity morphology is based on an interface between a thermally insulating portion of the heat conducting member and a thermally conducting portion of the heat conducting member; and
   positioning the heat conducting member such that the heat conducting member is in thermal communication with one or more of the one or more electrodes.

19. The method of claim 18, further comprising: convecting heat from the heat conducting member by moving a fluid across a tab that is in thermal communication with the heat conducting member.

20. The method of claim 19, wherein the fluid is one or more of air, water, and refrigerant.

* * * * *